(12) United States Patent
Otaibi et al.

(10) Patent No.: US 11,519,510 B1
(45) Date of Patent: Dec. 6, 2022

(54) RELIEF VALVE SEAL HOLDER

(71) Applicant: Saudi Arabian Oil Company, Dhahran (SA)

(72) Inventors: Mohammad K. Otaibi, Riyadh (SA); Ricardo Arquillo Rafael, Abqaiq (SA)

(73) Assignee: Saudi Arabian Oil Company

( * ) Notice: Subject to any disclaimer, the term of this patent is extended or adjusted under 35 U.S.C. 154(b) by 0 days.

(21) Appl. No.: 17/370,826

(22) Filed: Jul. 8, 2021

(51) Int. Cl.
*F16K 15/06* (2006.01)
*F16K 1/46* (2006.01)

(52) U.S. Cl.
CPC .............. *F16K 1/465* (2013.01); *F16K 15/06* (2013.01)

(58) Field of Classification Search
CPC ........ F16K 15/021; F16K 15/06; F16K 1/427; F16K 1/465; F16K 17/12; F16K 25/005
See application file for complete search history.

(56) References Cited

U.S. PATENT DOCUMENTS

| | | | |
|---|---|---|---|
| 2,525,799 A * | 10/1950 | Hecker | F16K 15/06 251/363 |
| 2,927,767 A * | 3/1960 | Ray | F16K 1/42 251/210 |
| 3,422,840 A | 1/1969 | Bryant et al. | |
| 4,834,338 A * | 5/1989 | Davis | F16K 1/427 251/332 |
| 6,135,132 A * | 10/2000 | Welker | F16K 25/005 251/360 |
| 6,571,822 B2 * | 6/2003 | Neugebauer | F16K 17/0426 137/538 |
| 7,565,913 B2 | 7/2009 | Pozzati | |
| 8,413,955 B1 * | 4/2013 | Rooney | F16K 1/465 251/332 |

OTHER PUBLICATIONS

Denflo, "Liquid Surge Relief Valve," M&J Valve an SPZ Brand, brochure, 2011, 8 pages.

* cited by examiner

*Primary Examiner* — Hailey K. Do
(74) *Attorney, Agent, or Firm* — Fish & Richardson P.C.

(57) ABSTRACT

A relief valve includes a polymeric ring seat, a cylindrical member, and an elastomeric seal. The cylindrical member is seated in the polymeric ring seat. The cylindrical member includes a first end, a second end, and a cylindrical wall extending from the first end to the second end. The cylindrical wall defines an inner bore having a uniform inner diameter from the first end to the second end. The cylindrical wall has a non-uniform outer diameter from the first end to the second end. An outer circumferential surface of the cylindrical wall is in contact with an inner circumferential surface of the polymeric ring seat. The elastomeric seal surrounds the polymeric ring seat. The elastomeric seal is configured to hold a relative position of the cylindrical member with respect to the polymeric ring seat.

13 Claims, 8 Drawing Sheets

RELIEF VALVE SEAL HOLDER

TECHNICAL FIELD

This disclosure relates to a holder for a relief valve seal.

BACKGROUND

A relief valve is a type of safety valve that is used to control or limit pressure in a system. Without the use of a relief valve, pressure may build up in the system, which can result in a process upset, instrument or equipment failure, fire, or a combination of these. A relief valve can be designed to open at a preset pressure or temperature. Pressure can be relieved from the system by allowing pressurized fluid to flow from an auxiliary passage out of the system through the relief valve. Relieving pressure through the relief valve can prevent damage to the system. Relief valves therefore serve as a layer of protection and allow for safe operations. It can be beneficial to maintain relief valves and test relief valves for reliability.

SUMMARY

Certain aspects of the subject matter described can be implemented as a method. A seat ring of a relief valve is separated into a first portion and a second portion. The first portion is shaped into a cylindrical member. The cylindrical member includes a first end, a second end, and a cylindrical wall extending from the first end to the second end. The cylindrical wall defines an inner bore having a uniform inner diameter from the first end to the second end. The cylindrical wall has a non-uniform outer diameter from the first end to the second end. The cylindrical member is installed into the relief valve.

This, and other aspects, can include one or more of the following features.

In some implementations, installing the cylindrical member into the relief valve includes placing an outer circumferential surface of the cylindrical wall in contact with an inner circumferential surface of a polymeric ring seat of the relief valve. In some implementations, installing the cylindrical member into the relief valve includes placing an elastomeric seal around the polymeric ring seat to hold a relative position of the cylindrical member with respect to the polymeric ring seat. In some implementations, the cylindrical member is installed into the relief valve independent of welding and chemical bonding.

In some implementations, an outer circumferential profile of the cylindrical wall complements an inner circumferential profile of the polymeric ring seat. In some implementations, the non-uniform outer diameter of the cylindrical wall increases from the first end to the second end. In some implementations, the cylindrical wall has a first outer diameter along a first portion of a longitudinal distance between the first end and the second end. In some implementations, the cylindrical wall has a second outer diameter along a second portion of the longitudinal distance between the first end and the second end. In some implementations, the second outer diameter is at least 2 inches greater than the first outer diameter. In some implementations, a ratio of the first portion of the longitudinal distance between the first end and the second end and the second portion of the longitudinal distance between the first end and the second end is about 4:6.

Certain aspects of the subject matter described can be implemented as a relief valve. A relief valve includes a polymeric ring seat, a cylindrical member, and an elastomeric seal. The cylindrical member is seated in the polymeric ring seat. The cylindrical member includes a first end, a second end, and a cylindrical wall extending from the first end to the second end. The cylindrical wall defines an inner bore having a uniform inner diameter from the first end to the second end. The cylindrical wall has a non-uniform outer diameter from the first end to the second end. An outer circumferential surface of the cylindrical wall is in contact with an inner circumferential surface of the polymeric ring seat. The elastomeric seal surrounds the polymeric ring seat. The elastomeric seal is configured to hold a relative position of the cylindrical member with respect to the polymeric ring seat.

This, and other aspects, can include one or more of the following features.

In some implementations, an outer circumferential profile of the cylindrical wall complements an inner circumferential profile of the polymeric ring seat. In some implementations, the non-uniform outer diameter of the cylindrical wall increases from the first end to the second end. In some implementations, the cylindrical wall has a first outer diameter along a first portion of a longitudinal distance between the first end and the second end. In some implementations, the cylindrical wall has a second outer diameter along a second portion of the longitudinal distance between the first end and the second end. In some implementations, the second outer diameter is at least 2 inches greater than the first outer diameter. In some implementations, a ratio of the first portion of the longitudinal distance between the first end and the second end and the second portion of the longitudinal distance between the first end and the second end is about 4:6.

Certain aspects of the subject matter described can be implemented as a method. A seat ring is removed from a relief valve. The relief valve includes the seat ring, a seat plug, and an elastomeric seal. After removing the seat ring, a position of the seat plug is adjusted to a first position in relation to a body of the relief valve. After adjusting the position of the seat plug to the first position, the elastomeric seal is removed. The seat ring is separated into a first portion and a second portion. The first portion is shaped into a cylindrical member. The cylindrical member includes a first end, a second end, and a cylindrical wall extending from the first end to the second end. The cylindrical wall defines an inner bore having a uniform inner diameter from the first end to the second end. The cylindrical wall has a non-uniform outer diameter from the first end to the second end. The cylindrical member is placed in a polymeric ring seat to form a seat assembly, such that an outer circumferential surface of the cylindrical wall is in contact with an inner circumferential surface of the polymeric ring seat. The position of the seat plug is adjusted to a second position in relation to the body of the relief valve. The second position is different from the first position. After adjusting the position of the seat plug to the second position, the seat assembly is installed in the relief valve. After installing the seat assembly in the relief valve, the elastomeric seal is installed on the seat assembly, such that the elastomeric seal surrounds the polymeric ring seat and holds a relative position of the cylindrical member with respect to the polymeric ring seat.

This, and other aspects, can include one or more of the following features.

In some implementations, an outer circumferential profile of the cylindrical wall complements an inner circumferential profile of the polymeric ring seat. In some implementations, the non-uniform outer diameter of the cylindrical wall increases from the first end to the second end. In some implementations, the cylindrical wall has a first outer diameter along a first portion of a longitudinal distance between the first end and the second end. In some implementations, the cylindrical wall has a second outer diameter along a second portion of the longitudinal distance between the first end and the second end. In some implementations, the second outer diameter is at least 2 inches greater than the first outer diameter. In some implementations, a ratio of the first portion of the longitudinal distance between the first end and the second end and the second portion of the longitudinal distance between the first end and the second end is about 4:6.

In some implementations, the seat assembly is installed in the relief valve independent of welding and chemical bonding. In some implementations, the elastomeric seal is installed on the seat assembly independent of welding and chemical bonding.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes a relief valve seal holder. The seal holder is in the form of a cylindrical member that is contacted with a polymeric ring seat. The cylindrical member and the polymeric ring seat are held together by an elastomeric seal that surrounds the polymeric ring seat. The subject matter described in this disclosure can be implemented in particular implementations, so as to realize one or more of the following advantages. The subject matter described can be implemented to mitigate and/or prevent failure of a surge relief valve, thereby decreasing maintenance costs, increasing operating life of the relief valve, and maintaining safe operations. Implementation of the subject matter described can make installation of the seat assembly of the relief valve easier and quicker in comparison to conventional seat assemblies, for example, seat assemblies that include molded rubber seat rings. Implementation of the subject matter described can minimize and/or prevent the need to replace metallic (hard) portions of the trim of a relief valve under normal operations. Implementation of the subject matter described can allow for needing to replace only the soft components (e.g., O-rings and the polymeric ring seat) during disassembly and reassembly of the relief valve.

Figure 1A:
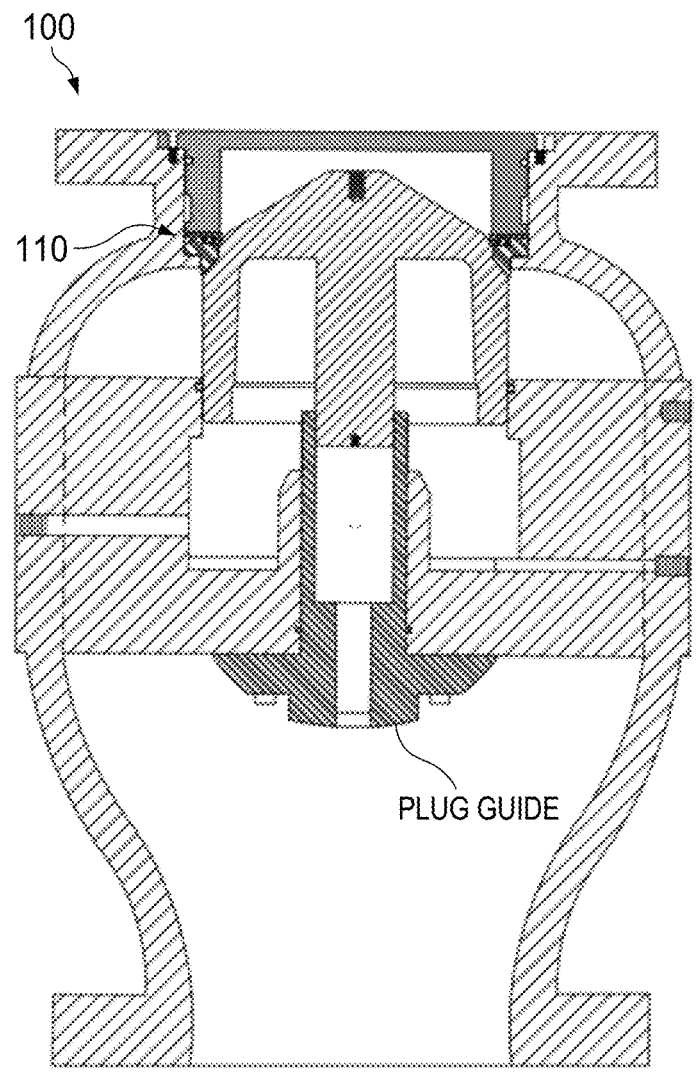
FIG. 1A is a schematic diagram of an example relief valve.
Figure 1B:
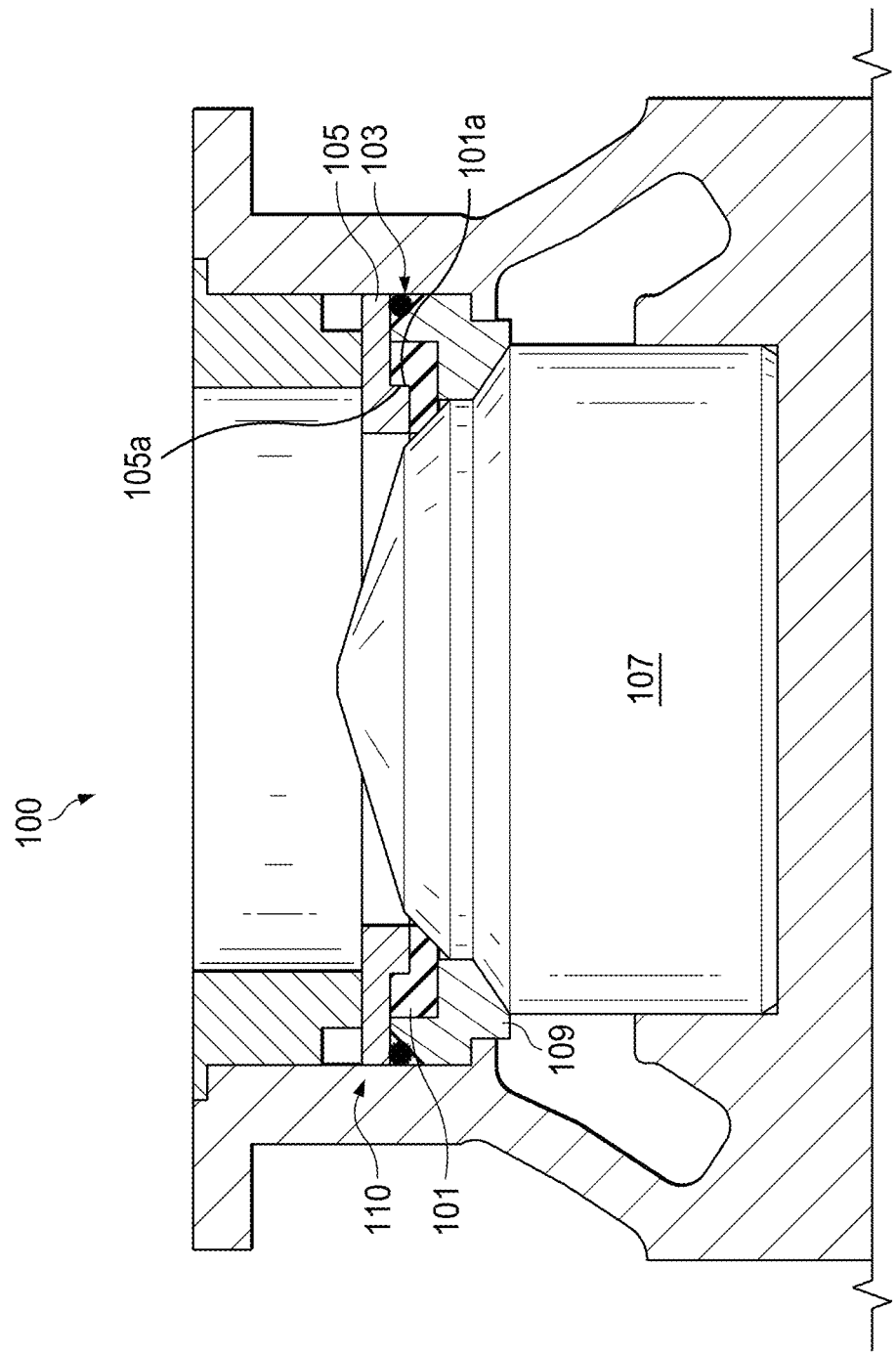
FIG. 1B is a schematic diagram of an enlarged view of a portion of the relief valve of FIG. 1A

FIG. 1A is a schematic diagram of a relief valve 100 including a seat assembly 110. FIG. 1B shows an enlarged view of the seat assembly 110. The relief valve 100 includes a polymeric ring seat 101, an elastomeric seal 103, and a cylindrical member 105. The elastomeric seal 103 surrounds the polymeric ring seat 101 and is configured to hold a relative position of the cylindrical member 105 with respect to the polymeric ring seat 101. For example, the elastomeric seal 103 holds the polymeric ring seat 101 against the cylindrical member 105 and keeps these components together. As shown in FIGS. 1A and 1i, an outer circumferential surface 105a of the cylindrical member 105 is in contact with an inner circumferential surface 101a of the polymeric ring seat 101. For example, an outer circumferential profile of the cylindrical wall can complement an inner circumferential profile of the polymeric ring seat. The polymeric ring seat 101 is made of a polymeric material. Desirable characteristics of the polymeric material include corrosion resistance, moisture resistant, unsusceptible to explosive decompression, long shelf-life, and a wide operating temperature (for example, −325 degrees Fahrenheit (° F.) to 500° F.). A non-limiting example of a polymeric material includes nylon. In some implementations, the elastomeric seal 103 includes an O-ring.

In some implementations, the relief valve 100 includes a seat plug 107. The seat plug 107 can include a plug seat. The seat plug 107 can define a cavity behind the plug seat, and in some implementations, the cavity is filled with an inert gas (such as nitrogen) to affect a set pressure of the relief valve 100. A loading force of the cavity may seat the relief valve 100 in place and can oppose a force generated by line pressure to the relief valve 100 (for example, the inlet of the relief valve 100). The cavity defined by the seat plug 107 can increase the open volume of the relief valve 100, which can allow for the relief valve 100 to open quickly and also close quickly without forceful slamming due to the cushioning effect of the inert gas (e.g., nitrogen) loaded in the cavity. In some implementations, the relief valve 100 includes a seat body 109. In some implementations, the polymeric ring seat 101, the cylindrical member 105, and the seat body 109 form a seat assembly 110. The polymeric ring seat 101 can improve a sealing force between an inner wall of the relief valve 100 and the seat body 109.

Figure 2A:
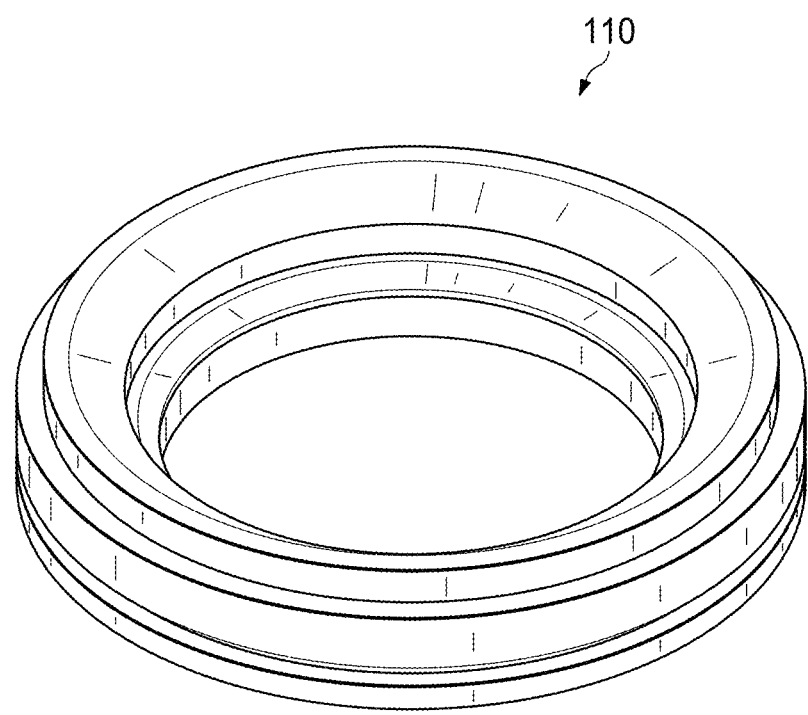
FIG. 2A is a schematic diagram of a seat assembly of the relief valve of FIG. 1A.
Figure 2B:
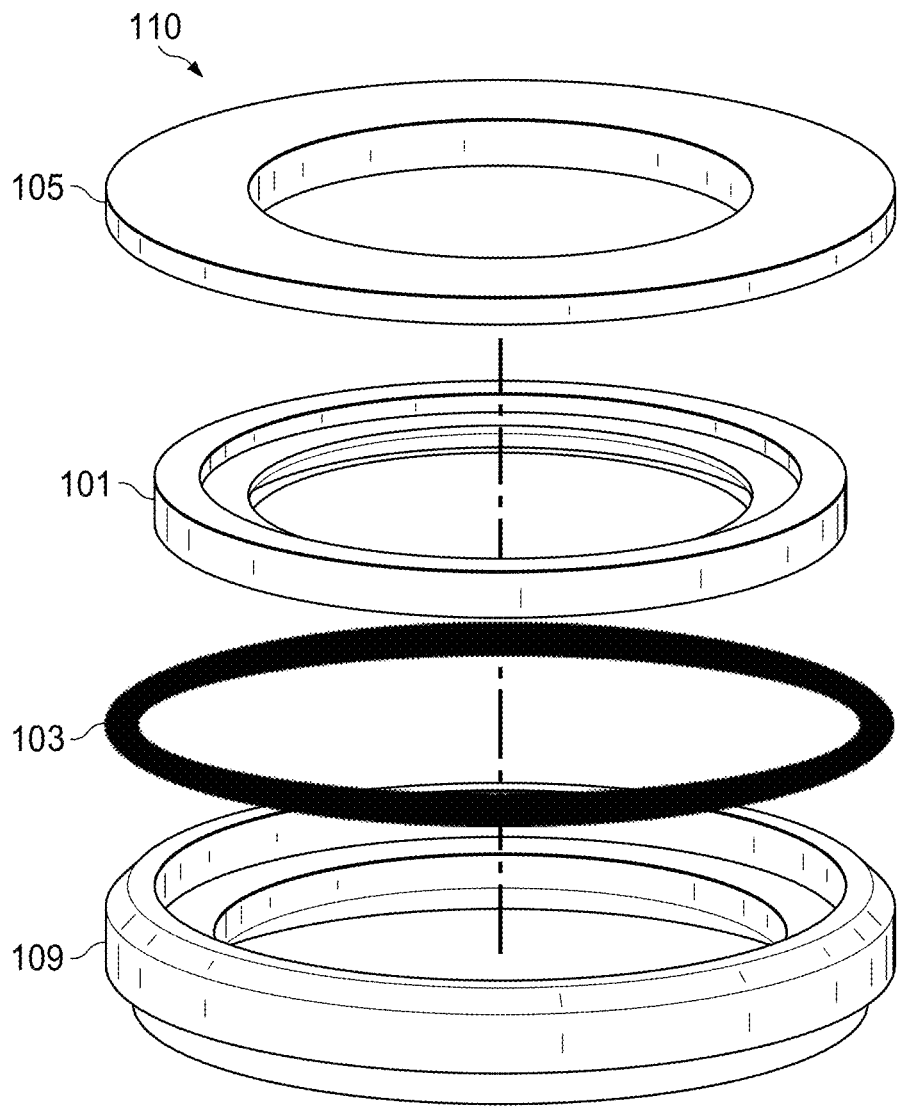
FIG. 2B is an exploded view of the seat assembly of FIG. 2A.

FIG. 2A is a schematic diagram of the seat assembly 110 of the relief valve 100. As mentioned previously, the seat assembly 110 can include the polymeric ring seat 101, the cylindrical member 105, and the seat body 109. FIG. 2B is an exploded view of the seat assembly 110, showing the polymeric ring seat 101, the cylindrical member 105, and the seat body 109 separated from each other. The seat body 109 in conjunction with the elastomeric ring 103 and cylindrical member 105 hold the polymeric ring seat 101 in place to resist movement when the seat plug 107 comes into contact with the polymeric ring seat 101.

Figure 2C:
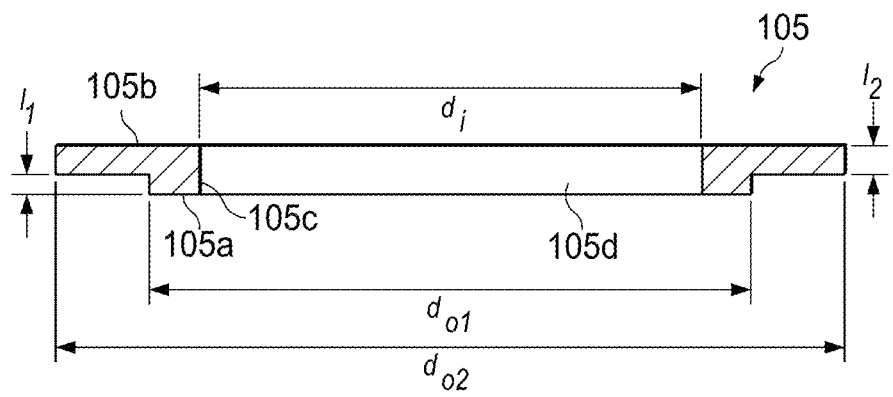
FIG. 2C is a schematic diagram of a seal holder of the seat assembly of FIG. 2A.

FIG. 2C is a schematic diagram of the cylindrical member 105. The cylindrical member 105 includes a first end 105a, a second end 105b, and a cylindrical wall 105c. The cylindrical wall 105c extends from the first end 105a to the second end 30 105b. The cylindrical wall 105c defines an inner bore 105d that has a uniform inner diameter ($d_i$) from the first end 105a to the second end 105b. The cylindrical wall 105c has a non-uniform outer diameter from the first end 105a to the second end 105b. In some implementations, the outer circumferential surface of the cylindrical wall 105c is in contact with the inner circumferential surface of the polymeric ring seat 101 (shown in FIGS. 1B, 2A, and 2B).

In some implementations, the uniform inner diameter ($d_i$) of the inner bore 105d is about 11.56 inches. In some implementations, the non-uniform outer diameter of the cylindrical wall 105c varies from the first end to the second end. For example, the non-uniform outer diameter of the cylindrical wall 105c increases from the first end to the second end. In some implementations, the non-uniform outer diameter varies in a range of from about 12.12 inches to about 14 inches. In some implementations, the cylindrical wall has a first outer diameter ($d_{o1}$) along a first portion of a longitudinal distance between the first end and the second end. For example, the first outer diameter ($d_{o1}$) is about 12.12 inches. In some implementations, the cylindrical wall 105c has a second outer diameter ($d_{o2}$) along a second portion of the longitudinal distance between the first end and the second end. For example, the second outer diameter ($d_{o2}$) is about 14 inches. In some implementations, the longitudinal distance between the first end and the second end is about 0.265 inches. In some implementations, a ratio of the first portion of the longitudinal distance between the first end and the second end and the second portion of the longitudinal distance between the first end and the second end is about 4:6. For example, the first portion of the longitudinal distance between the first end and the second end is about 0.105 inches, and the second portion of the longitudinal distance between the first end and the second end is about 0.165 inches. Although shown in FIG. 2C as having two different outer diameters, the cylindrical wall 105c can have additional different outer diameters according to the shape desired for retaining the polymeric ring seat 101 in the relief valve 100. In some implementations, the outer diameter of the cylindrical wall 105c gradually varies from the first end 105a to the second end 105b instead of changing step-wise.

Figure 3A:
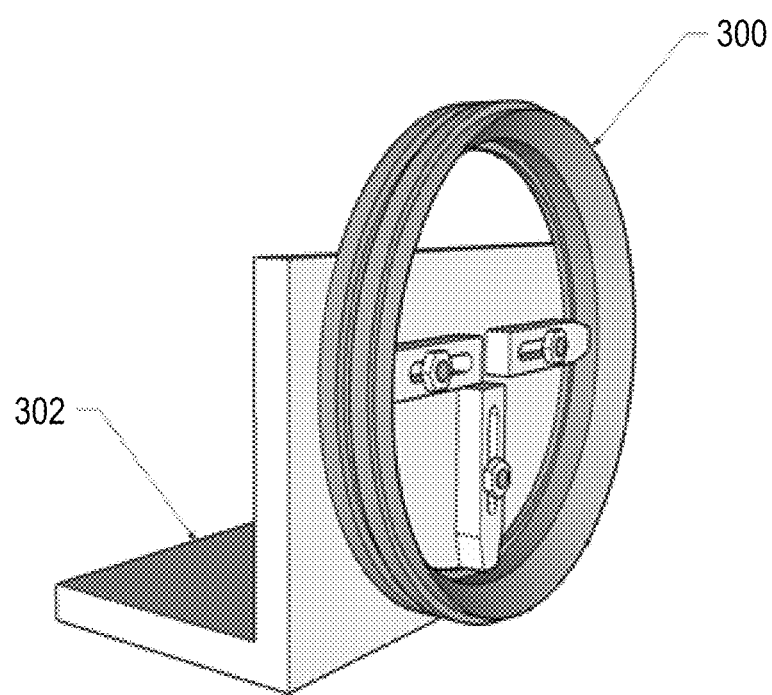
FIG. 3A is a schematic diagram of an example seat ring of the relief valve of FIG. 1A, disposed on an angle block to be modified.
Figure 3B:
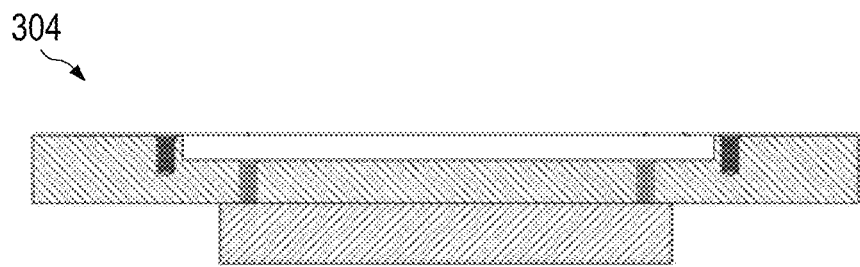
FIG. 3B is a side view of an example machining jig for modifying the seat ring of FIG. 3A.
Figure 3C:
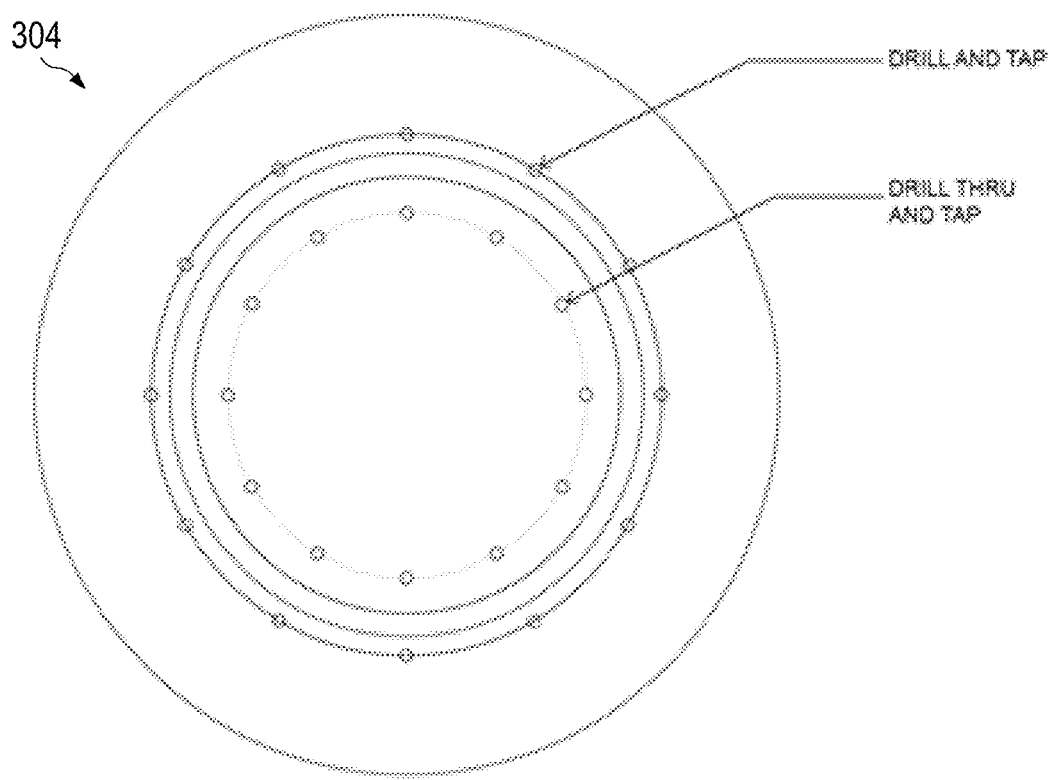
FIG. 3C is a front view of the machining jig of FIG. 3B.

FIG. 3A is a schematic diagram of an example seat ring 300 of a relief valve. The seat ring 300 is taken out of a relief valve (for example, the relief valve 100) in order to be modified. The seat ring 300 can be metallic. As shown in FIG. 3A, the seat ring 300 can then be disposed on an angle block 302 to be modified. FIGS. 3B and 3C are a side view and a front view, respectively, of an example machining jig 304 for modifying the seat ring 300. The machining jig 304 can be used to separate the seat ring 300 into discrete portions.

Figure 4A:
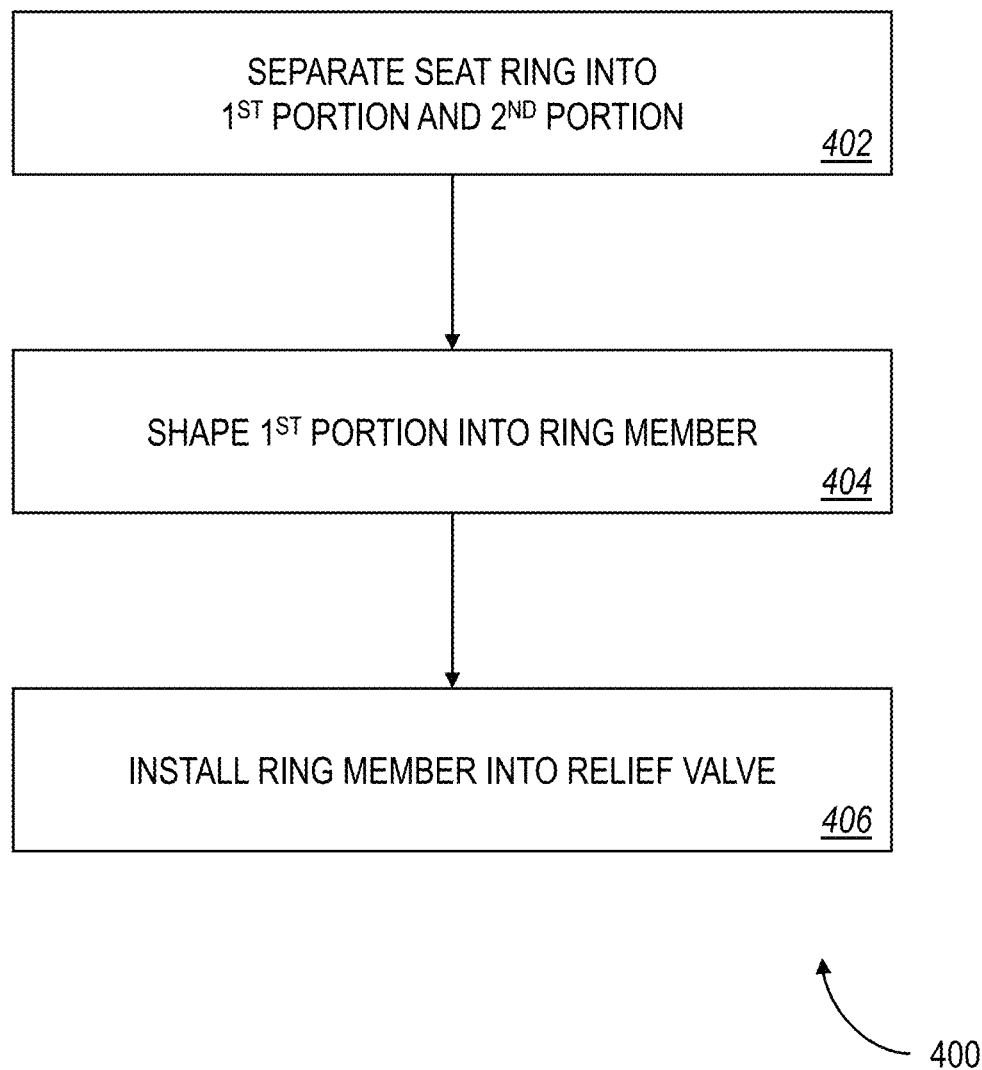
FIG. 4A is a flow chart of an example method for fabricating a relief valve seal holder.

FIG. 4A is a flow chart of a method 400 for fabricating a relief valve seal holder, such as the cylindrical member 105. At step 402, a seat ring (such as the seat ring 300) of a relief valve (such as the relief valve 100) is separated into a first portion and a second portion. In some implementations, separating the seat ring into the first portion and the second portion includes cutting the seat ring with a machining jig (such as the machining jig 304). At step 404, the first portion is shaped into a cylindrical member, such as the cylindrical member 105. The second portion can be discarded. As described previously, the cylindrical member 105 includes a first end 105a, a second end 105b, and a cylindrical wall 105c. The cylindrical wall 105c extends from the first end 105a to the second end 105b. The cylindrical wall 105c defines an inner bore 105d that has a uniform inner diameter ($d_i$) from the first end 105a to the second end 105b. The cylindrical wall 105c has a non-uniform outer diameter from the first end 105a to the second end 105b.

At step 406, the cylindrical member 105 is installed into the relief valve 100. In some implementations, installing the cylindrical member 105 into the relief valve 100 at step 406 includes placing an outer circumferential surface of the cylindrical wall (such as the cylindrical wall 105c) in contact with an inner circumferential surface of a polymeric ring seat (such as the polymeric ring seat 101) of the relief valve 100. In some implementations, installing the cylindrical member 105 into the relief valve 100 at step 406 includes placing an elastomeric seal (such as the elastomeric seal 103) around the polymeric ring seat 101 to hold a relative position of the cylindrical member 105 with respect to the polymeric ring seat 101. In some implementations, the cylindrical member 105 is installed into the relief valve 100 at step 406 independent of welding and chemical bonding. For example, the elastomeric seal 103 holds the polymeric ring seat 101 and the cylindrical member 105 together without requiring welding or chemical bonding between the two components.

Figure 4B:
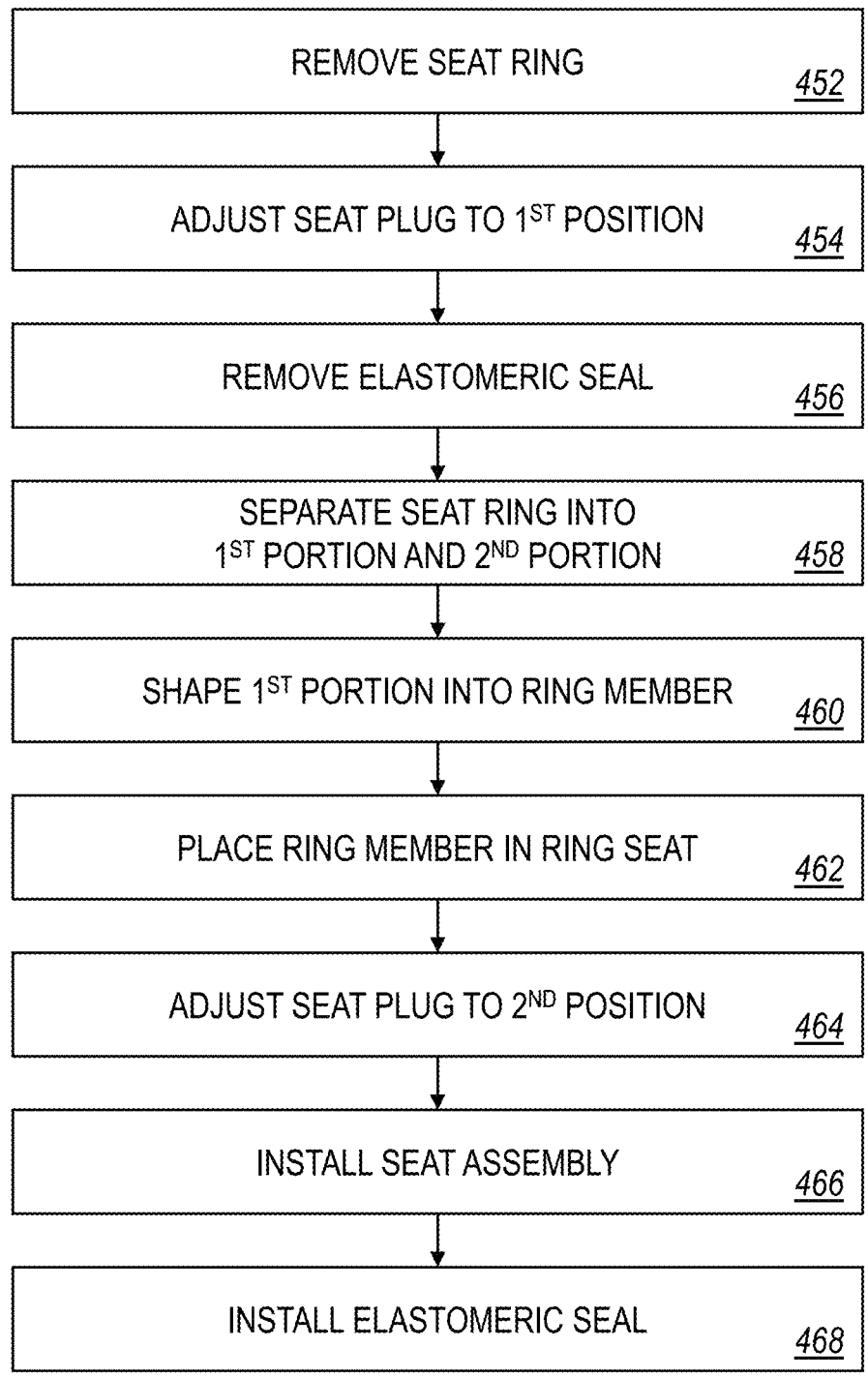
FIG. 4B is a flow chart of an example method for modifying a relief valve.

FIG. 4B is a flow chart of a method 450 for modifying a relief valve, such as the relief valve 100. In some implementations, the relief valve 100 includes a seat ring, a seat plug (such as the seat plug 107), and an elastomeric seal (such as the elastomeric seal 103). At step 452, a seat ring is removed from the relief valve 100. After removing the seat ring at step 452, a position of the seat plug 107 is adjusted to a first position in relation to the body of the relief valve 100 at step 454. After adjusting the position of the seat plug 107 to the first position at step 454, the elastomeric seal 103 is removed from the relief valve 100 at step 456. At step 458, the seat ring is separated into a first portion and a second portion. At step 460, the first portion is shaped into a cylindrical member, such as the cylindrical member 105. As described previously, the cylindrical member 105 includes a first end 105a, a second end 105b, and a cylindrical wall 105c. The cylindrical wall 105c extends from the first end 105a to the second end 105b. The cylindrical wall 105c defines an inner bore 105d that has a uniform inner diameter ($d_i$) from the first end 105a to the second end 105b. The cylindrical wall 105c has a non-uniform outer diameter from the first end 105a to the second end 105b.

At step 462, the cylindrical member 105 is placed in a polymeric ring seat (such as the polymeric ring seat 101) to form a seat assembly (such as the seat assembly 110). The cylindrical member 105 is placed in the polymeric ring seat 101 at step 462, such that an outer circumferential surface of the cylindrical wall 105c is in contact with an inner circumferential surface of the polymeric ring seat 101. At step 464, the position of the seat plug 107 is adjusted to a second position in relation to the body of the relief valve 100. The second position is different from the first position. After adjusting the position of the seat plug 107 to the second position at step 464, the seat assembly 110 is installed in the relief valve 100 at step 466. In some implementations, the seat assembly 110 is installed in the relief valve 100 at step 466 independent of welding and chemical bonding. After installing the seat assembly 110 in the relief valve at step 466, the elastomeric seal 103 is installed on the seat assembly 110 at step 468. The elastomeric seal 103 is installed on the seat assembly 110 at step 468, such that the elastomeric seal 103 surrounds the polymeric ring seat 101 and holds a relative position of the cylindrical member 105 with respect to the polymeric ring seat 101. In some implementations, the elastomeric seal 103 is installed on the seat assembly 110 at step 468 independent of welding and chemical bonding.

Example

A relief valve was modified to include the cylindrical member 105. Pressure was relieved through the relief valve until the pressure was completely relieved. Once verified that the pressure was completely bled from the relief valve, control piping and operator assembly were disconnected and removed. All upstream and downstream flange studs (except one from each flange) were removed. The relief valve was moved out of the piping. Once the relief valve was moved, the flange studs were re-inserted to keep the relief valve in place outside of the piping. Once the relief valve was secured in place, the retainer screws were removed from the retainer, and the retainer was moved out from the body of the relief valve. Once the retainer was moved, the seat assembly was removed from the relief valve (step 452). The position of the seat plug was adjusted from the body of the relief valve (step 454). The O-ring (and backup rings) were then removed from the body of the relief valve (step 456). Once the parts were removed, the body of the relief valve was inspected for wear in case it needed to be replaced. The seat ring from the seat assembly was cut (step 458) and shaped to form the cylindrical member 105 (step 460).

The O-ring was greased, and the O-ring and backup rings were re-inserted into the body of the relief valve (step 462). The seat plug was greased, and the position of the seat plug was re-adjusted into the body of the relief valve (step 464). The seat assembly 110 including the polymeric ring seat 101 was greased and inserted into the body of the relief valve. The cylindrical member 105 was installed to bridge a gap between the seat assembly 110 and the body of the relief valve (step 466). A retainer O-ring was greased and installed (step 468). Then the retainer screws were inserted and tightened. The relief valve was then re-positioned in the piping, and the flange studs were re-secured. The operator assembly and control piping were reconnected, and the relief valve was recharged and put into service.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A method comprising:
    separating a seat ring of a relief valve into a first portion and a second portion;
    shaping the first portion into a cylindrical member comprising:
        a first end;
        a second end; and
        a cylindrical wall extending from the first end to the second end, the cylindrical wall defining an inner bore having a uniform inner diameter from the first end to the second end, and the cylindrical wall having a non-uniform outer diameter from the first end to the second end; and
    installing the cylindrical member into the relief valve.

2. The method of claim 1, wherein installing the cylindrical member into the relief valve comprises:
    placing an outer circumferential surface of the cylindrical wall in contact with an inner circumferential surface of a polymeric ring seat of the relief valve; and
    placing an elastomeric seal around the polymeric ring seat to hold a relative position of the cylindrical member with respect to the polymeric ring seat.

3. The method of claim 2, wherein the cylindrical member is installed into the relief valve independent of welding and chemical bonding.

4. The method of claim 2, wherein an outer circumferential profile of the cylindrical wall complements an inner circumferential profile of the polymeric ring seat.

5. The method of claim 4, wherein the non-uniform outer diameter of the cylindrical wall increases from the first end to the second end.

6. The method of claim 4, wherein the cylindrical wall has a first outer diameter along a first portion of a longitudinal distance between the first end and the second end, and the cylindrical wall has a second outer diameter along a second portion of the longitudinal distance between the first end and the second end, wherein the second outer diameter is at least 2 inches greater than the first outer diameter.

7. The method of claim 6, wherein a ratio of the first portion of the longitudinal distance between the first end and the second end and the second portion of the longitudinal distance between the first end and the second end is about 4:6.

8. A relief valve comprising:
a polymeric ring seat;
a cylindrical member seated in the polymeric ring seat, the cylindrical member comprising:
 a first end;
 a second end; and
 a cylindrical wall extending from the first end to the second end, the cylindrical wall defining an inner bore having a uniform inner diameter from the first end to the second end, and the cylindrical wall having a non-uniform outer diameter from the first end to the second end and increasing from the first end to the second end, wherein an outer circumferential surface of the cylindrical wall is in contact with an inner circumferential surface of the polymeric ring seat, wherein an outer circumferential profile of the cylindrical wall complements an inner circumferential profile of the polymeric ring seat, wherein the cylindrical wall has a first outer diameter along a first portion of a longitudinal distance between the first end and the second end, and the cylindrical wall has a second outer diameter along a second portion of the longitudinal distance between the first end and the second end, wherein the second outer diameter is at least 2 inches greater than the first outer diameter, and a ratio of the first portion of the longitudinal distance between the first end and the second end and the second portion of the longitudinal distance between the first end and the second end is about 4:6; and
an elastomeric seal surrounding the polymeric ring seat, the elastomeric seal configured to hold a relative position of the cylindrical member with respect to the polymeric ring seat.

9. A method comprising:
removing a seat ring from a relief valve, the relief valve comprising the seat ring, a seat plug, and an elastomeric seal;
after removing the seat ring, adjusting a position of the seat plug to a first position in relation to a body of the relief valve;
after adjusting the position of the seat plug to the first position, removing the elastomeric seal;
separating the seat ring into a first portion and a second portion;
shaping the first portion into a cylindrical member comprising:
 a first end;
 a second end; and
 a cylindrical wall extending from the first end to the second end, the cylindrical wall defining an inner bore having a uniform inner diameter from the first end to the second end, and the cylindrical wall having a non-uniform outer diameter from the first end to the second end;
placing the cylindrical member in a polymeric ring seat to form a seat assembly, such that an outer circumferential surface of the cylindrical wall is in contact with an inner circumferential surface of the polymeric ring seat;
adjusting the position of the seat plug to a second position in relation to the body of the relief valve, the second position different from the first position;
after adjusting the position of the seat plug to the second position, installing the seat assembly in the relief valve; and
after installing the seat assembly in the relief valve, installing the elastomeric seal on the seat assembly, such that the elastomeric seal surrounds the polymeric ring seat and holds a relative position of the cylindrical member with respect to the polymeric ring seat.

10. The method of claim 9, wherein an outer circumferential profile of the cylindrical wall complements an inner circumferential profile of the polymeric ring seat.

11. The method of claim 10, wherein the non-uniform outer diameter of the cylindrical wall increases from the first end to the second end.

12. The method of claim 10, wherein the cylindrical wall has a first outer diameter along a first portion of a longitudinal distance between the first end and the second end, and the cylindrical wall has a second outer diameter along a second portion of the longitudinal distance between the first end and the second end, wherein the second outer diameter is at least 2 inches greater than the first outer diameter.

13. The method of claim 12, wherein a ratio of the first portion of the longitudinal distance between the first end and the second end and the second portion of the longitudinal distance between the first end and the second end is about 4:6.

* * * * *